(12) United States Patent
Urmanov et al.

(10) Patent No.: US 9,116,804 B2
(45) Date of Patent: Aug. 25, 2015

(54) TRANSIENT DETECTION FOR PREDICTIVE HEALTH MANAGEMENT OF DATA PROCESSING SYSTEMS

(75) Inventors: Aleksey M. Urmanov, San Diego, CA (US); Anton A. Bougaev, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 97 days.

(21) Appl. No.: 13/598,783

(22) Filed: Aug. 30, 2012

(65) Prior Publication Data

US 2014/0067773 A1  Mar. 6, 2014

(51) Int. Cl.
| | |
|---|---|
| *G06F 17/30* | (2006.01) |
| *G06F 11/07* | (2006.01) |
| *G06F 11/34* | (2006.01) |
| *H04L 12/24* | (2006.01) |
| *G06F 15/16* | (2006.01) |

(52) U.S. Cl.
CPC ........ *G06F 11/0754* (2013.01); *G06F 11/0709* (2013.01); *G06F 11/3409* (2013.01); *G06F 17/30* (2013.01); *G06F 17/30306* (2013.01); *H04L 41/00* (2013.01)

(58) Field of Classification Search
CPC .... G05B 15/02; G05B 2219/13; G06F 17/28; G06F 19/24; G06F 1/3234; G06F 17/00; G06F 17/30247; G06F 17/30265; G06F 17/30289; G06F 17/30312; G06F 17/30864; G06F 17/30867; G06F 19/22; G06F 19/322; G06F 19/328; G06F 19/34; G06F 19/3431; G06F 1/3206; G06F 3/048; G06F 3/0484; G06F 7/00

USPC .......................................................... 707/688
See application file for complete search history.

(56) References Cited

U.S. PATENT DOCUMENTS

| | | | |
|---|---|---|---|
| 7,058,666 B1 * | 6/2006 | Li et al. ................................. | 1/1 |
| 7,167,812 B1 | 1/2007 | Urmanov et al. | |
| 7,171,586 B1 | 1/2007 | Gross et al. | |
| 7,194,451 B2 * | 3/2007 | Chaudhuri et al. ........... | 707/694 |
| 7,292,952 B1 | 11/2007 | Gross et al. | |
| 7,548,820 B2 | 6/2009 | Urmanov et al. | |
| 7,797,262 B2 | 9/2010 | Bougaev et al. | |
| 7,890,813 B2 | 2/2011 | Usynin et al. | |
| 8,000,932 B2 * | 8/2011 | Ding et al. ..................... | 702/182 |
| 8,055,928 B2 | 11/2011 | Bougaev et al. | |
| 2005/0223089 A1 * | 10/2005 | Rhodes ......................... | 709/223 |
| 2007/0033129 A1 * | 2/2007 | Coates ........................ | 705/36 R |
| 2009/0063509 A1 * | 3/2009 | Lockhart et al. ................ | 707/10 |

* cited by examiner

*Primary Examiner* — Alex Gofman
(74) *Attorney, Agent, or Firm* — Kraguljac Law Group, LLC

(57) ABSTRACT

Systems, methods, and other embodiments associated with transient detection for predictive health management are described. In one embodiment, a method includes receiving a health signal from a data outlet. The health signal corresponds to a derivative variable derived from a combination of data processing system metrics not exposed beyond the data outlet. A transient is detected in the health signal. In response to detecting the transient, the method includes performing a corrective action. The example method may also include detecting the transient in a health signal from a data processing system by collecting historical values of the health signal; selecting a first statistical model that best fits the historical values; receiving a present value of the health signal; and applying the first statistical model to the present value of the health signal to determine whether the present value of the health signal is a transient.

16 Claims, 6 Drawing Sheets

TRANSIENT DETECTION FOR PREDICTIVE HEALTH MANAGEMENT OF DATA PROCESSING SYSTEMS

BACKGROUND

Database-based systems' usage and maintenance are getting increasingly challenging and complicated. Managing the health of database-based systems involves continuous monitoring and alarming systems, but also, in many cases, human intervention for diagnostics and decision making. Human expertise can become prohibitively expensive considering the complexity of some database-based systems.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

While some database-based systems provide diagnostic variables that are monitored to estimate system health, cloud based systems present unique challenges that make continuous monitoring impractical. For example, in cloud based systems, data processing systems may be centralized in vast facilities that include complex networks. Technical support personnel not associated with the companies whose data is stored in the facility may be charged with monitoring the database hardware that stores and processes data for many different clients. The technical support personnel may not be familiar with the specific trends that occur in the clients' data, making it difficult for them to interpret diagnostic variables. This may result in false alarms or, worse, missed warning signs of a data processing system malfunction.

Further challenges are created by the fact that sensitive data may be stored in the centralized facilities, which are remotely located from the users that access the data. Care must be taken that diagnostic variables used to monitor data processing system health do not divulge confidential information. For example, an online retail company may not want outside personnel having access to a number of transactions currently being processed by the retail company's online transaction processing (OLTP) system, even though this metric could be used as an input to a health monitoring system.

Systems and methods are described herein that provide continuous monitoring to produce automatic corrective actions and/or to automatically alert technical personnel when human intervention is recommended. The continuous monitoring is enabled by systematic statistical transient detection on data outlets that report health signals. In some embodiments the health signals monitored by the systems are derivative variables are derived from system metrics not exposed beyond the metric. Using data outlets that provide only derivative information allows for monitoring of system performance in a blind, secure manner. Decision making modules can provide automatic corrective measures and/or alert technical personnel based on detected statistical transients.

Figure 1:
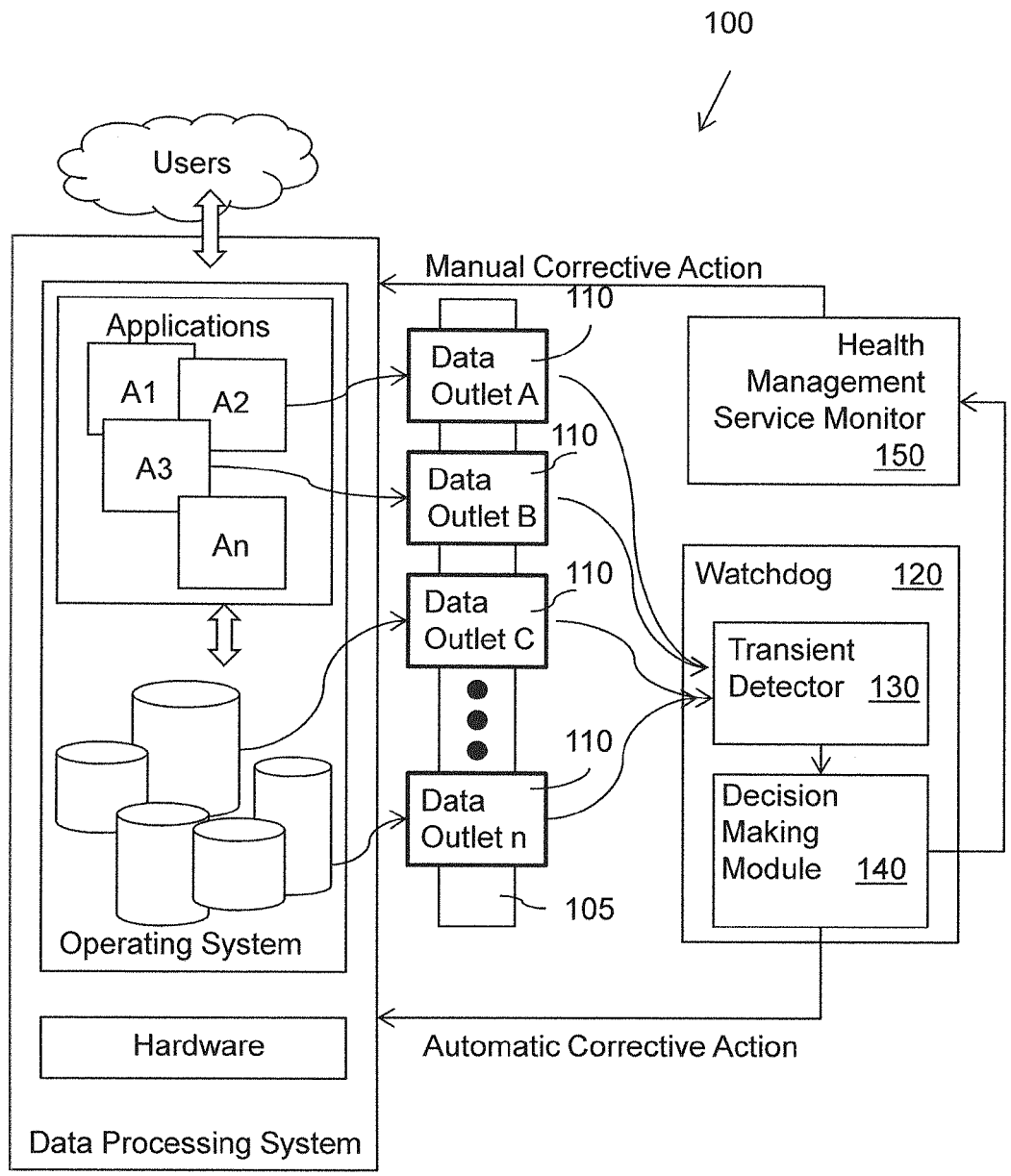
FIG. 1 illustrates one embodiment of a system associated with transient detection for predictive health management.

With reference to FIG. 1, one embodiment of a system 100 associated with transient detection for predictive health management of data processing systems is illustrated. The system 100 includes a manifold 105 of software data outlets 110 through which the system monitors health signals from the data processing system. In one embodiment, the health signals are derivative variables and each data outlet 110 includes a software protocol combined with hardware networking communication means and services to report current data processing system state in the form of derivative variables.

Derivative variables are variables that are derived from observable system metrics but are not exposed beyond the data outlet. For example, a derivative variable may be a rolling accumulation of a number of transactions processed by an online transaction processing system over the course of a fixed time duration. The number of transactions is provided at the data outlet 110 as a simple integer value. Information about the manner in which the integer value is derived is not provided by the data outlet 110. However, the integer value provides one indication of the health of the online data processing system. The integer value may be monitored and, based on the historical trajectories of the integer value, predictions about the health of the data processing system may be made without knowledge of the integer value's derivation. Thus, the use of the data outlet allows for monitoring information about a data processing system's operation in a blind, secure manner.

The derivative values may be derived using any combination of hardware, operating system, application or other metrics associated with the data processing system. When the data processing system includes a database, one or more of the following metrics may be used to compile an appropriate derivative value: number of error log alerts, amount of archive area used, average file read/write time, broken job count, lock limit usage, service CPU time per call, service response time per call, deferred transaction count, dump area used, buffer cache hit percentage, CPU usage per second, CPU usage per transaction, cursor cache hit percentage, data dictionary hit percentage, database CPU time percentage, global cache average convert time, query response time, and a percentage of java pool that is free. Other database related metrics may also be selected to compile derivative values for use in health monitoring.

When the data processing system includes a server, one or more of the following metrics may be used to compile an appropriate derivative value: HTTP 200s percentage, request handling time for a module, request handling throughput for a module per second, a number of active HTTP connections, and response data throughput per second. Other server related metrics may also be selected to compile derivative values for use in health monitoring.

When the data processing system includes enterprise manager, one or more of the following metrics may be used to compile an appropriate derivative value: database system job processing time, database system jobs up vs. jobs down, job dispatcher step average backlog, job dispatcher processing time, loader throughput, notification processing time, number of roles. Other enterprise management related metrics may also be selected to compile derivative values for use in health monitoring.

When the data processing system includes a management agent, one or more of the following metrics may be used to compile an appropriate derivative value: CPU consumption percentage, number of files open, number of threads created, resident memory utilization, virtual memory utilization, and availability of the management agent. Other management agent related metrics may also be selected to compile derivative values for use in health monitoring. While the described embodiments monitor health signals that are derivative variables, other health signals may be used.

A watchdog logic 120 is configured to monitor the derivative values provided by the data outlets 110 and to provide feedback to a health management service monitor 150 (e.g., system administrative personnel) and/or to automatically perform corrective actions. The watchdog logic 120 includes a transient detector 130 that collects derivative variable data from each data outlet 110 using a predetermined protocol and fixes the time it took to collect the data as well as any auxiliary information made available during the data collections (e.g., whether the data processing system was functioning properly during data collection). In this manner, the transient detector 120 forms a historical process line for the behavior of each outlet (e.g., derivative variable). FIGS. 2-5 provide additional detail about how various embodiments of the transient detector 120 collect and analyze derivative variable data to detect transients.

When a transient (e.g., a value outside a normal range as predicted by a selected statistical model) is detected by the transient detector 120, a signal is sent a decision making module 140 that determines a type of corrective action to be taken. The decision making module 140 analyzes the type of transient that has been detected and selects a corrective action that has been mapped to the type of transient. The decision making module 140 may perform an automatic corrective action mapped to the specific type of transient that was detected. The decision making module 140 may alert the health management service monitor 150 that a transient that typically indicates a critical condition has been detected so that system administrative personnel may take appropriate action.

The derivative variables provided by each outlet 110 implicitly reflect transient behavior of the data processing system without revealing sensitive user information. Since the transient detector 130 has no information about how any given derivative variable corresponds to the health of the data processing system, the transient detector 130 relies on statistical analysis of the historical behavior of the derivative variable to detect transients based on the assumption that a transient indicates a change in health status. Thresholding techniques are performed on the cumulative derivative variable data to detect abnormal system behavior (e.g., transients).

Figure 2:
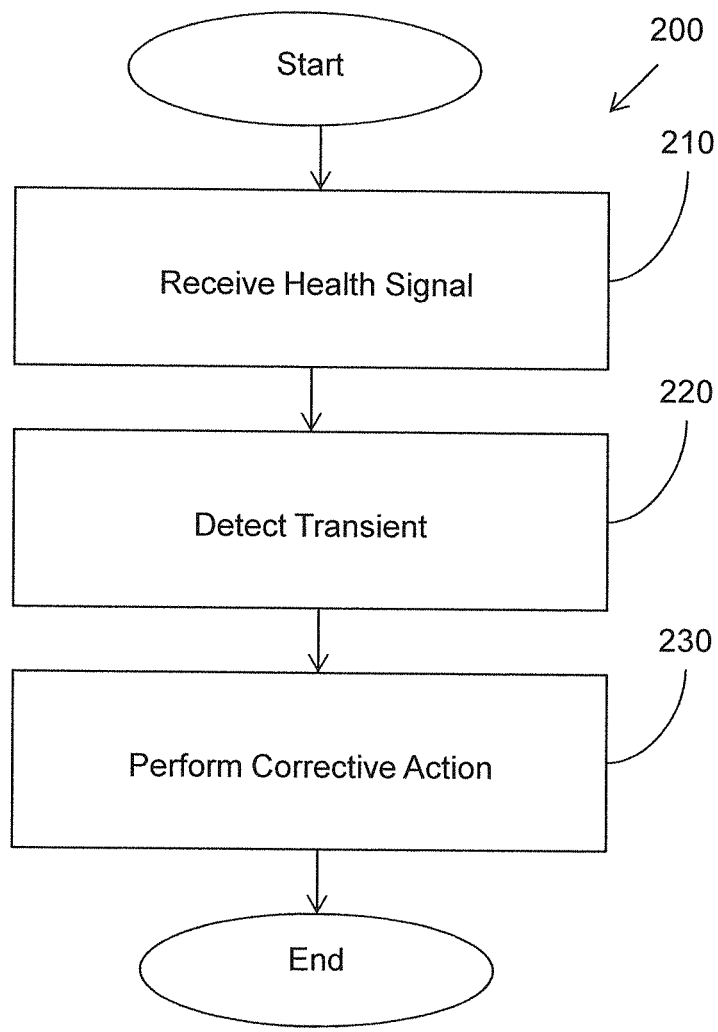
FIG. 2 illustrates one embodiment of a method associated with transient detection for predictive health management.
Figure 3:
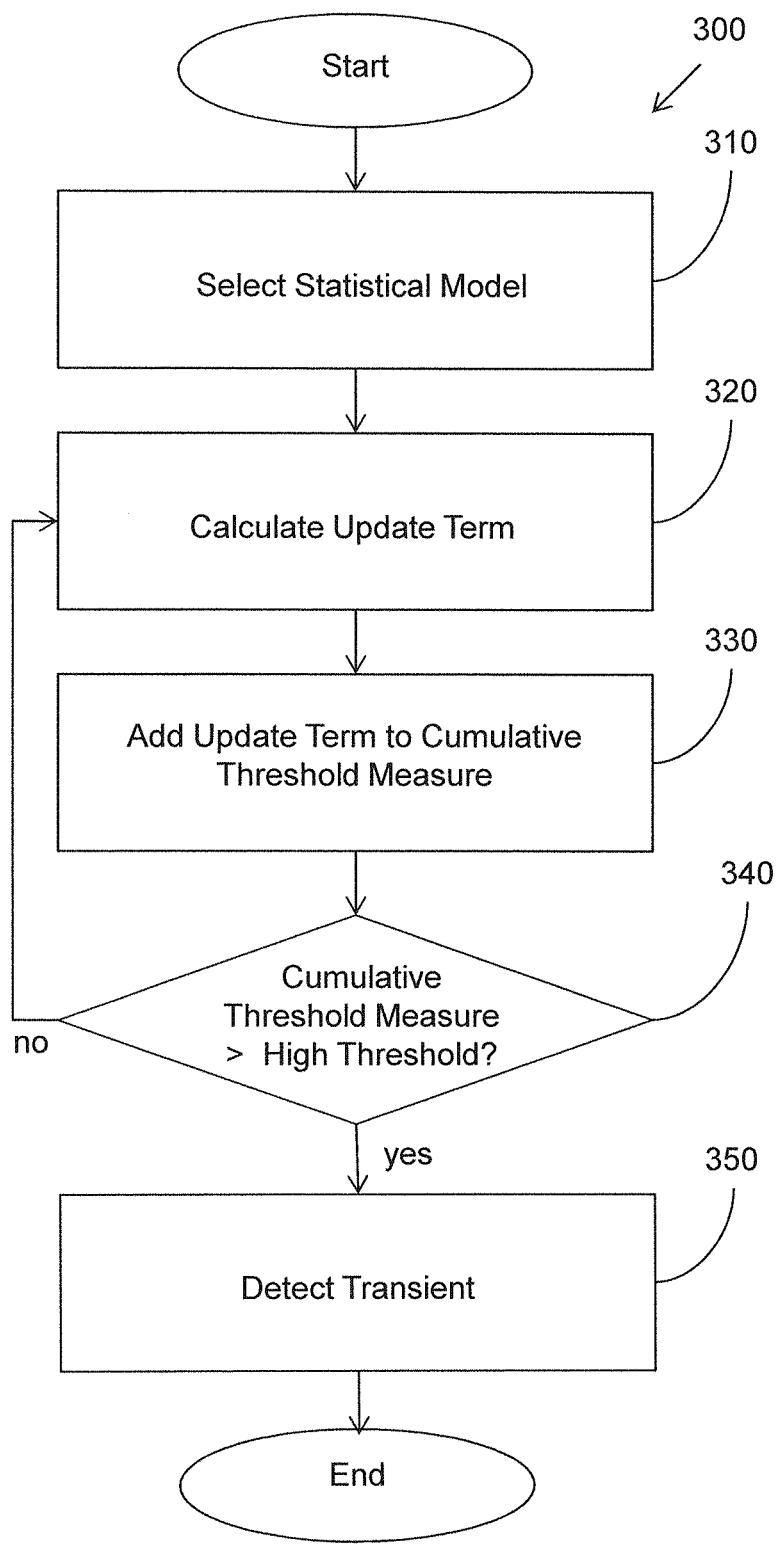
FIG. 3 illustrates one embodiment of a method associated with transient detection for predictive health management.
Figure 4:
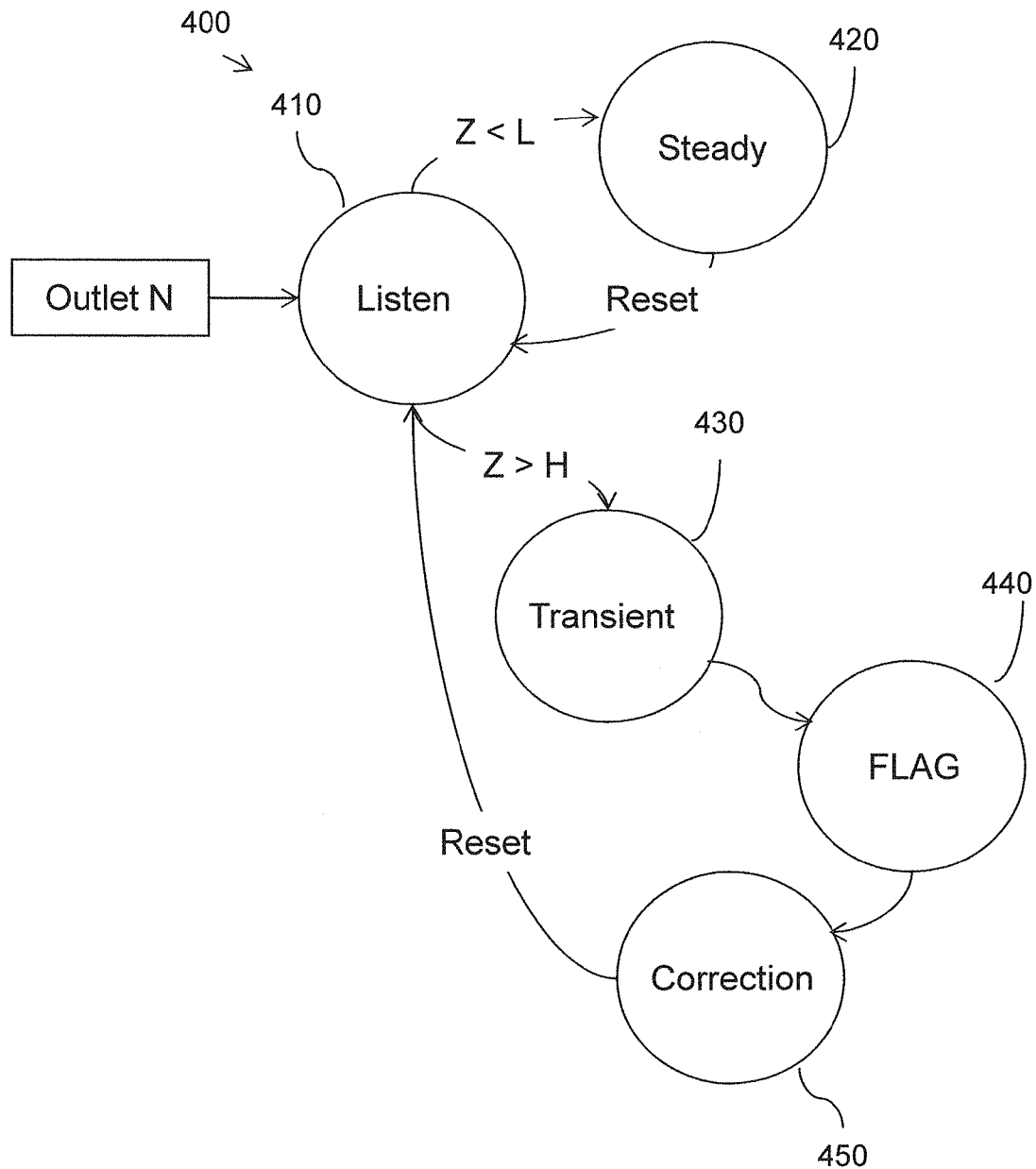
FIG. 4 illustrates an embodiment of a method associated with transient detection for predictive health management.
Figure 5:
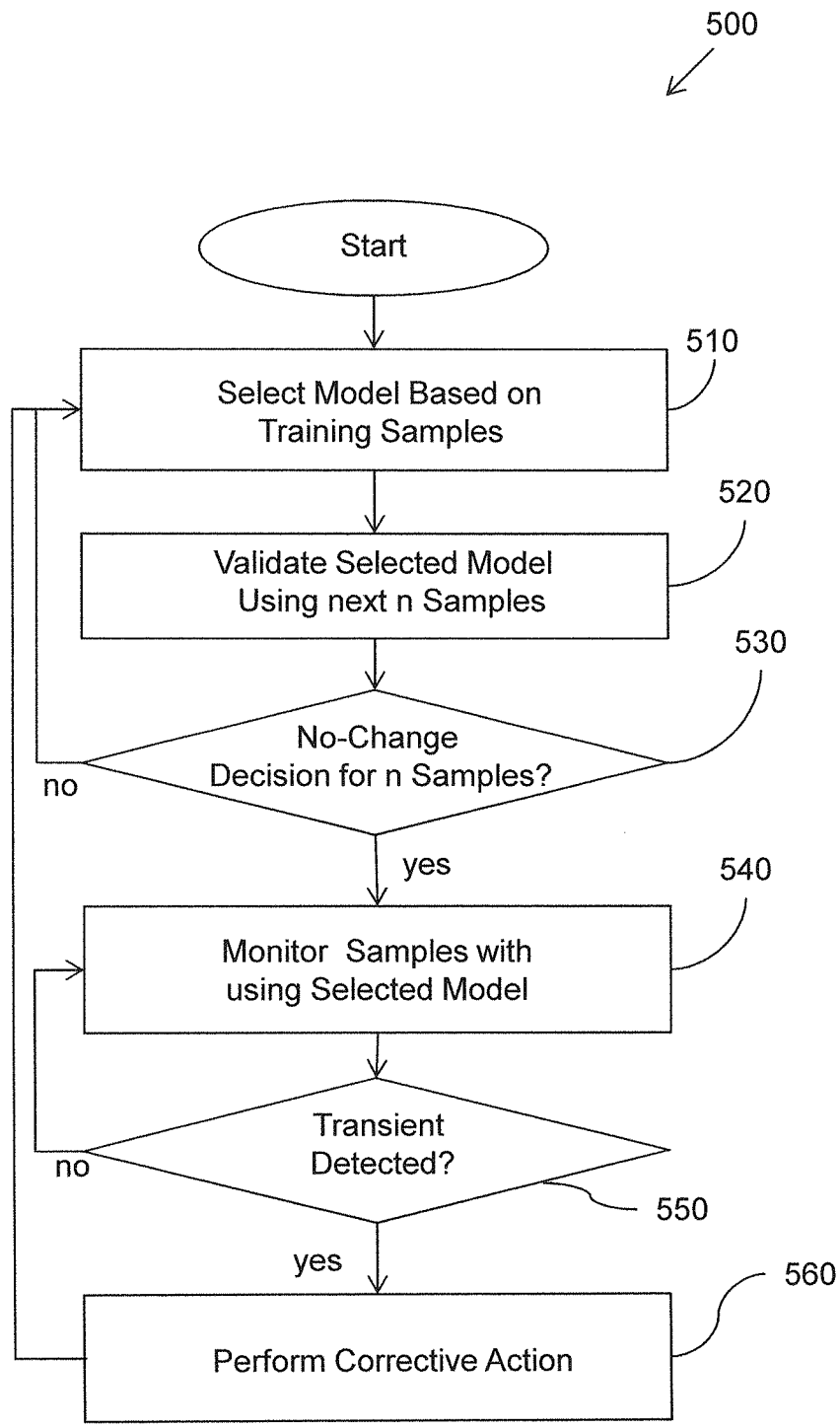
FIG. 5 illustrates an embodiment of a method associated with transient detection for predictive health management.

FIG. 2 illustrates one embodiment of a method 200 that predicts the health of a data processing system. At 210, the method includes receiving a derivative variable from a data outlet. As discussed above, the derivative variable is derived from a combination of data processing system metrics not exposed beyond the data outlet. At 220, the method includes detecting a transient in the derivative variable. FIGS. 3-5 describe in more detail how transients may be detected according to various embodiments. At 230, the method includes, in response to detecting the transient, performing a corrective action.

FIGS. 3-5 illustrate various embodiments of transient detection methods. In the methods, a cumulative threshold measure Z is calculated based on a newly collected sample of derivative variable data and a statistical model that has been selected to model the derivative variable data. With each new sample a determination is made as to whether to i) accept a hypothesis that there is no change in derivative variable or ii) reject the hypothesis that there is no change in the derivative variable (e.g., detect a transient).

If the cumulative threshold measure Z (see FIG. 4) is above a threshold H, then the tested hypothesis should be rejected (e.g., the derivative variable has changed, and a transient is detected). When the cumulative threshold measure Z is below a threshold L, then the tested hypothesis should be accepted (e.g., the derivative variable has not changed).

H and L are calculated based on missed transient and false transient rates that can be tolerated in the transient detection scheme. The probability of alpha risk, the risk of a false transient is used to calculate H and L. Beta risk, which is the probability of a missed transient, is also used to calculate H and L. H and L are set for each derivative variable (e.g., data outlet) and can be adjusted as appropriate based on the cost of false and missed alarms for a particular data outlet. In one embodiment, H can be computed as log((1−beta)/alpha) and L can be computed as log(beta/(1−alpha)). For example, data outlets whose derivative values are used to control disk space can be tuned in a way that a probability of a missed transient is minimized.

FIG. 3 illustrates one embodiment of a method for detecting a transient in a derivative variable. The method 300 does not rely on any a priori information about how values of the derivative variable may indicate acceptable or unacceptable health of the data processing system. Rather, the method utilizes a model selection based statistical analysis of the historical trajectory of values for the derivative variable. At 310, a statistical model is selected that best models a set of training samples of the derivative variable. As additional samples are collected during monitoring of the derivative variable, pairs of candidate models may be compared periodically to determine which model best fits the augmented or most recent set of values. A new model may be selected based on the comparison of the pairs of candidate models. In some embodiments, when a new model is identified as best fitting the candidate data, a transient may be detected.

At 320, an update term is calculated based on the selected model and a new sample of derivative variable data. For example, given that a normal model is selected as best fitting the data, the update term U calculated from the new sample Value[n] is:

$$U[n]=\tfrac{1}{2}\{(V[n]-\mu_0)^2/s_0^2-\mu_1)^2/s_1^2\}$$

The term $\mu$ corresponds to the mean of the normal model that has been selected to model the derivative variable and s corresponds to the standard deviation, where $\mu_0$ and $s_0$ represent a derivative variable without any transient, and $\mu_1$ and $s_1$ represent a derivative variable with a transient. If a different statistical model was selected, a different calculation would be made to derive the update term. At 330, the update term U[n] is added to a most recent version of a cumulative threshold measure Z[n−1] such that the present value of the cumulative threshold measure Z is derived as:

$$Z[n]=Z[n-1]+U[n]$$

Z[n] is set to zero at the start of the transient detection method 300. At 340, the cumulative threshold measure is compared to an upper threshold value. If the cumulative threshold measure is less than the upper threshold value (e.g., H) a new update term is calculated using a new sample of derivative variable data at 320. If the cumulative threshold value exceeds the upper threshold, at 350 a transient is detected. In some embodiments, if the cumulative threshold value crosses a lower threshold (e.g., L), Z[n] is reset to zero.

In some embodiments, the method 300 includes selecting a maximum amount of deviation between the health signal and a mean of historical values of the health signal that will not result in a detected transient. The upper threshold is calculated based on an expected standard deviation of derivative variable values and the selected maximum value. The method may include selecting a minimum amount of deviation between the derivative variable and a mean of historical values of the derivative variable that indicates that no transient is present. The lower threshold is calculated based on an expected standard deviation of derivative variable values and the selected minimum amount of deviation.

FIG. 4 is a state diagram that provides an overview of one embodiment of a transient detection method 400 that is based on model selection and a cumulative threshold measure. At 410 the method is in a listening state in which the value of Z[n] is calculated. As long as Z[n] is between the lower threshold L and the upper threshold H, the method remains in the listening state 410. If the value of Z[n] is less than L, the method transitions to a steady state 420 meaning that no transient has been detected and Z[n] is reset to zero. If the value of Z[n] is greater than H, the method transitions to state 430 and a transient is detected. At 440, a flag is set to indicate that the transient has been detected and the method transitions to state 450 in which a correction is made. The correction may be made automatically or an alert may be sent so that the correction may be made by administrative personnel. After the correction has been made, Z[n] is reset to zero and the method returns to state 410.

FIG. 5 illustrates one embodiment of a method 500 for monitoring system health using model selection and a cumulative threshold measure to detect transients. At 510, the method includes selecting a model that fits historical derivative variable values. A normal model is one model that may be appropriate for many derivative variables. A Frechet model may also be selected. The Frechet model is well suited for modeling data that experiences extreme events (e.g., transients). The model may be selected by collecting a predetermined number of training samples of the derivative variable and fitting two or more models to the training samples. The best fitting model is selected. At 520, the selected model is validated by calculating an update term for each sample based on the selected model and adding the update term to the cumulative threshold measure. At 530, if the cumulative measure is above the lower threshold, the training process begins again at 510.

If the cumulative threshold measure remains below the lower threshold L for the n samples, the model is considered validated and the method continues at 540. At 540, samples of the derivative variable are monitored using the model selection technique. If the value of the derivative variable exceeds the upper threshold, at 550 a transient is detected. When the transient is detected, at 560 a corrective action is performed.

As can be seen from the foregoing description, the methods and systems described herein enable health management of data processing systems without a priori knowledge of the specific signals that are being monitored. This facilitates centralized management of data processing systems by personnel unfamiliar with the data being processed, such as in a cloud based environment.

General Computer Embodiment

Figure 6:
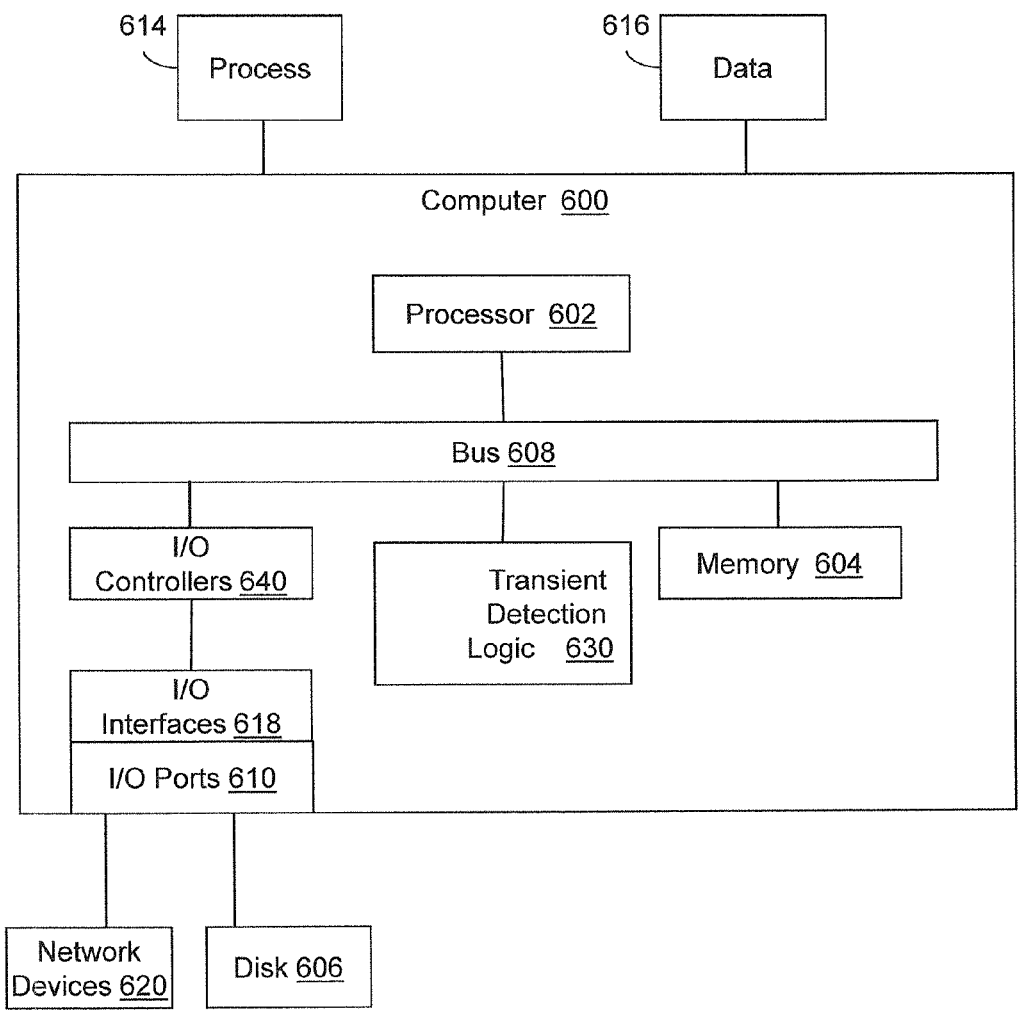
FIG. 6 illustrates an embodiment of a computing system in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a transient detection logic 630 configured to facilitate detecting transients for predictive health management of data processing systems. In different examples, the transient detection logic 630 may be implemented in hardware, a non-transitory computer-readable medium with stored instructions, firmware, and/or combinations thereof. While the logic 630 is illustrated as a hardware component attached to the bus 608, it is to be appreciated that in one example, the transient detection logic 630 could be implemented in the processor 602.

In one embodiment, logic 630 is a means (e.g., hardware, non-transitory computer-readable medium, firmware) for transient detection. The means may be implemented, for example, as an ASIC programmed to receive a derivative variable from a data outlet. The derivative variable is derived from a combination of data processing system metrics not exposed beyond the data outlet. The ASIC is programmed to detect a transient in the derivative variable; and in response to detecting the transient, performing a corrective action. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for detecting a transient in a health signal from a data processing system by collecting historical values of the health signal; selecting a first statistical model that best fits the historical values; receiving a present value of the health signal; and applying the first statistical model to the present value of the health signal to determine whether the present value of the health signal is a transient. In some embodiments, the health signal is a derivative variable.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an acceptable operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods outlined in FIGS. 2-5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Wherein multiple logics are described, it may be possible to incorporate the multiple logics into one physical logic. Similarly, wherein a single logic is described, it may be possible to distribute that single logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to perform a method, the method comprising:
    with a component external to a data processing system, receiving a derivative value from a data outlet that isolates data processing system metrics from detection by the component, wherein the derivative value comprises a combination of the data processing system metrics that are not exposed beyond the data outlet;
    collecting historical values for the derivative value during operation of the data processing system;
    selecting a statistical model that best fits the historical values from between at least two statistical models;
    accumulating a cumulative threshold measure by:
        calculating an update term based on a difference between a mean derivative value of the selected statistical model and a present value of the derivative value; and
        adding the update term to a present value of the cumulative threshold measure;
    when the cumulative threshold measure exceeds an upper threshold, detecting a transient; and
    in response to detecting the transient, performing a corrective action.

2. The non-transitory computer-readable medium of claim 1, wherein the method further comprises when the cumulative threshold measure is below a lower threshold, resetting the cumulative threshold measure to zero.

3. The non-transitory computer-readable medium of claim 1, wherein the method further comprises resetting the cumulative threshold measure to zero after performing the corrective action.

4. The non-transitory computer-readable medium of claim 1, wherein performing the corrective action comprises actuating data processing system components to perform a predetermined corrective action.

5. The non-transitory computer-readable medium of claim 1, wherein performing the corrective action comprises alerting a human operator that a transient has been detected at the data outlet.

6. The non-transitory computer-readable medium of claim 1, wherein the method further comprises receiving a default threshold value for use in detecting transients in a given data outlet.

7. The non-transitory computer-readable medium of claim 1, wherein the method further comprises:
    collecting new historical values for the derivative value during a subsequent period of operation of the data processing system;
    selecting a different statistical model that best fits the new historical values from between the at least two statistical models; and
    determining a new criteria for detecting a transient in the derivative value using the different statistical model.

8. A computing system, comprising:
    a data outlet that isolates data processing system metrics from detection by components in the computing system, wherein the data outlet is configured to cause the processor to receive a derivative value from the data processing system, wherein the derivative value comprises a combination of data processing system metrics not exposed beyond the data outlet;
    a processor, comprising:
        a transient detector in signal communication with the data outlet, wherein the transient detector is configured to cause the processor to:
            collect a first set of historical values for the derivative value;
            select a first statistical model that best fits the first set of historical values from among at least two statistical models;
            monitor the derivative value;
            accumulate a cumulative threshold measure by:
                calculating an update term based on a difference between a mean derivative value of the selected statistical model and a present value of the derivative value; and
                adding the update term to a present value of the cumulative threshold measure; and
            detect a transient in the derivative value when the cumulative threshold measure exceeds an upper threshold;
        a decision making module configured to cause the processor to perform a corrective action in response to detection of the transient by the transient detector.

9. The computing system of claim 8, wherein the transient detector is further configured to cause the processor to reset the cumulative threshold measure to zero when the cumulative threshold measure is below a lower threshold.

10. The computing system of claim 8, wherein the transient detector is further configured to cause the processor to:
    collect new historical values for the derivative value during a subsequent period of operation of the data processing system;
    select a different statistical model that best fits the new historical values from between the at least two statistical models; and
    determine a new criteria for detecting a transient in the derivative value using the different statistical model.

11. A computer-implemented method comprising:
with a component external to a data processing system, receiving a derivative value from a data outlet that isolates data processing system metrics from detection by the component, wherein the derivative value comprises a combination of the data processing system metrics that are not exposed beyond the data outlet;
collecting historical values for the derivative value during operation of the data processing system;
selecting a statistical model that best fits the historical values from between at least two statistical models;
accumulating a cumulative threshold measure by:
  calculating an update term based on a difference between a mean derivative value of the selected statistical model and a present value of the derivative value; and
  adding the update term to a present value of the cumulative threshold measure;
when the cumulative threshold measure exceeds an upper threshold, detecting a transient; and
in response to detecting the transient, performing a corrective action.

12. The computer-implemented method of claim 11, further comprising when the cumulative threshold measure is below a lower threshold, resetting the cumulative threshold measure to zero.

13. The computer-implemented method of claim 11, further comprising resetting the cumulative threshold measure to zero after performing the corrective action.

14. The computer-implemented method of claim 11, where performing the corrective action comprises actuating data processing system components to perform a predetermined corrective action.

15. The computer-implemented method of claim 11, where performing the corrective action comprises alerting a human operator that a transient has been detected at the data outlet.

16. The computer-implemented method of claim 11, further comprising receiving a default threshold value for use in detecting transients in a given data outlet.

* * * * *